(12) United States Patent
Baumgartner et al.

(10) Patent No.: US 8,113,058 B2
(45) Date of Patent: Feb. 14, 2012

(54) PIEZOELECTRIC PRESSURE TRANSDUCER

(75) Inventors: Martin Baumgartner, Gross St. Florian (AT); Christian Reiter, Krieglach (AT); Friedrich Anton Holzinger, Graz (AT); Alexander Schricker, Graz (AT)

(73) Assignee: Piezocryst Advanced Sensorics GmbH, Graz (AT)

( * ) Notice: Subject to any disclaimer, the term of this patent is extended or adjusted under 35 U.S.C. 154(b) by 73 days.

(21) Appl. No.: 12/585,305

(22) Filed: Sep. 10, 2009

(65) Prior Publication Data
US 2010/0058875 A1   Mar. 11, 2010

(30) Foreign Application Priority Data

Sep. 11, 2008 (AT) .................. A 1417/2008
Nov. 19, 2008 (AT) .................. A 1802/2008

(51) Int. Cl.
*G01L 9/00*   (2006.01)

(52) U.S. Cl. ...................... 73/723; 361/283.1

(58) Field of Classification Search .......................... None
See application file for complete search history.

(56) References Cited

U.S. PATENT DOCUMENTS

| | | | |
|---|---|---|---|
| 4,559,821 A | 12/1985 | Engeler et al. | |
| 4,578,735 A * | 3/1986 | Knecht et al. | 361/283.4 |
| 4,993,266 A | 2/1991 | Omura et al. | |
| 7,048,839 B2 * | 5/2006 | Harada | 204/266 |
| 7,603,906 B2 | 10/2009 | Kröger et al. | |

* cited by examiner

*Primary Examiner* — Andre Allen
(74) *Attorney, Agent, or Firm* — Dykema Gossett PLLC

(57) ABSTRACT

To render possible a high-quality, yet cost-effective provision suitable for mass production of a piezoelectric pressure transducer (1) with at least one piezoelectric measuring element (3, 3', 3") arranged on a housing base part (2), which measuring element is connected on the opposite side to a diaphragm (4), the measuring element (3, 3', 3") is fixed on an electrode sheet (5, 5', 5", 5'") or directly on the base part 2 or the diaphragm 4, wherein the electrode sheet (5, 5', 5", 5'") wraps conductively and positively as well as in a manner fixing the layers around a contact pin (7) insulated with respect to the base part (2) and projecting outwards.

14 Claims, 6 Drawing Sheets

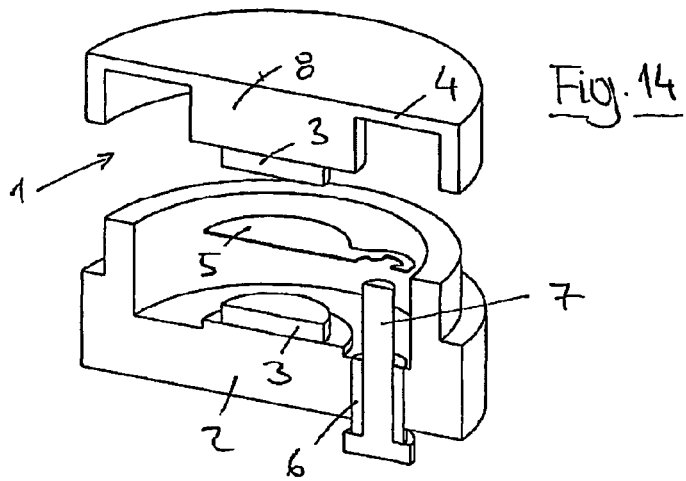
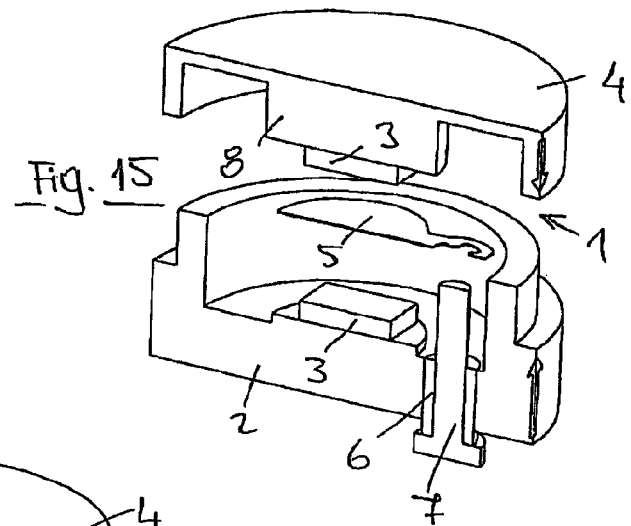
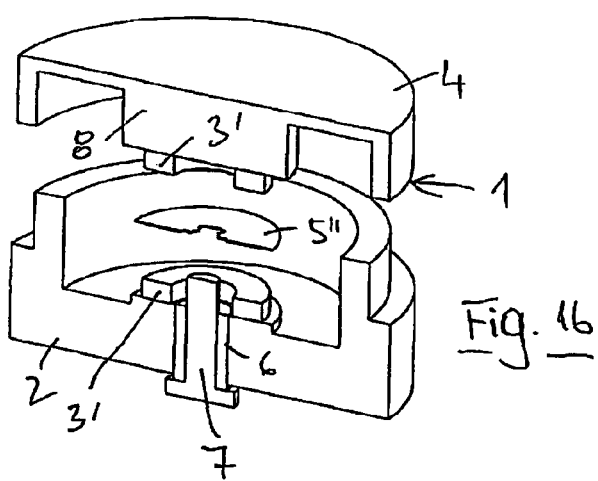

PIEZOELECTRIC PRESSURE TRANSDUCER

BACKGROUND OF THE INVENTION

1. Field of the Invention

The invention relates to a piezoelectric pressure transducer, with at least one piezoelectric measuring element arranged on a housing base part, which measuring element is connected on the side opposite the base part to a diaphragm sealing the base part and exposed to the pressure to be measured, and which bears against an electrode sheet during contact of one of its poles.

2. The Prior Art

Piezoelectric pressure transducers with diaphragms have been known for a long time in a variety of embodiments—see by way of example FIG. 3 in EP 352 773 or FIG. 1 in EP 90 871 A1. The pressure acting on the diaphragm from outside is transmitted as a force to the measuring element, which provides a charge, proportional to the pressure, to both poles in a manner that can be tapped and used further. Although the design of pressure transducers of this type is basically very simple, the contacting of the two poles and the positioning of the measuring elements in particular require a relatively high expenditure in terms of construction and production engineering, which has hitherto prevented a mass production at low cost desirable for many applications.

Furthermore, corresponding pressure transducers are known, for example, from AT 503 816 A in which a facilitation or improvement of the positioning of the measuring elements in the assembly of the transducer is rendered possible in that the measuring element or the measuring element stack is fixed to a lead electrode or to an electrode sheet making contact with one of its poles. However, the exact positioning with respect to the housing is thereby also carried out by means of additional elements, which furthermore entails additional expenditure in terms of construction and production engineering.

The object of the present invention is to improve a piezoelectric pressure transducer of the type mentioned at the outset such that the simple basic principle can be implemented consistently in a simple and cost-effective yet nevertheless high-quality mass production.

SUMMARY OF THE INVENTION

This object is attained according to the present invention with a pressure transducer of this type in that the electrode sheet or each electrode sheet wraps conductively and positively as well as in a manner fixing the layers around a contact pin projecting outwards. Thus initially the layer fixing of the electrode sheet, which is very important for a reproducible quality, at the same time as the contacting of the pole of the measuring element or the measuring elements attached there is solved in a surprisingly simple and exact manner, which permits a very simple and thus cost-effective design of the pressure transducer without the necessity of further fitting elements or the like.

In a preferred embodiment of the invention at least one of the measuring elements can thereby be fixed directly on an associated electrode sheet, preferably by means of bonding, soldering or thermocompression. A positive position fixing of the mechanical unit of measuring element and electrode sheet is thus possible at the same time as the contacting of the one pole of the measuring element, which further simplifies in particular the production and assembly of a pressure transducer of this type in an advantageous manner.

In a further preferred embodiment of the invention, the second pole of the measuring element is thereby contacted via the housing base part and/or the diaphragm, which represents a further simplification and completely avoids additional expenditure in this respect.

In another preferred embodiment of the invention, however, the second pole of the measuring element can also be connected conductively and positively as well as in a manner fixing the layers via a further electrode sheet to a further contact pin projecting outwards, wherein then electrically insulating pressure transmission elements are arranged between the electrode sheets on the one hand and the base part or diaphragm on the other hand. This renders possible a double-pole contacting of the measuring element or several installed measuring elements that is insulated with respect to the housing and the installation environment, which is necessary for many applications, wherein the advantages regarding the positive layer fixing are retained with the simultaneous contacting of the measuring elements via the electrode sheets.

In a further embodiment of the invention, the electrode sheet can bear two measuring elements electrically connected thereby in a mirror-inverted manner, the other pole of which is connected on the one hand via the base part and on the other hand via the diaphragm conductively connected thereto. The signal yield is thus increased in a simple manner without making the design of the pressure transducer more complicated.

In a further embodiment of the invention the measuring element or measuring elements can be embodied in an annular manner and arranged concentrically around the contact pin, which renders possible a symmetrical design of the pressure transducer, which is advantageous for some applications.

In a further preferred embodiment of the invention several measuring elements can also be arranged around the centrally arranged contact pin in a star-shaped manner in one plane, which makes it possible to also use smaller measuring elements in a greater number.

According to another preferred embodiment of the invention, at least one of the measuring elements and/or an electrically insulating pressure transmission element can also be fixed directly on the base part and/or the diaphragm, preferably by means of bonding, soldering or thermocompression. The alignment and fixing of the elements bearing against the housing base part or against the diaphragm thus takes place directly thereon, which considerably facilitates in particular the assembly of multiple-part mechanical units comprising measuring elements, electrode sheets and optionally pressure transmission elements.

In a particularly preferred embodiment of the invention, the diaphragm can be embodied as an essentially cup-shaped part—for example, also a one-piece turned part or deep drawn part and directly connected to the housing base part, preferably by means of circumferential welding. This renders possible a very simple production and assembly from a few parts, which further promotes the cost-effective mass production of pressure transducers of this type.

Apart from this, in another embodiment of the invention the housing base part can also be embodied essentially in a cup-shaped manner and directly connected to the diaphragm embodied essentially in a flat manner, preferably again by means of circumferential welding, which renders possible further design possibilities for the pressure transducer or the manufacture thereof.

The invention is described in more detail below based on the exemplary embodiments shown diagrammatically in the drawings.

BRIEF DESCRIPTION OF THE DRAWINGS

FIGS. 14 through 20 show in an exploded view further different exemplary embodiments of piezoelectric pressure transducers according to the invention in which the element respectively bearing against the housing base part and against the diaphragm is aligned to and fixed to these components in advance.

DETAILED DESCRIPTION OF THE PREFERRED EMBODIMENTS

Figure 1:
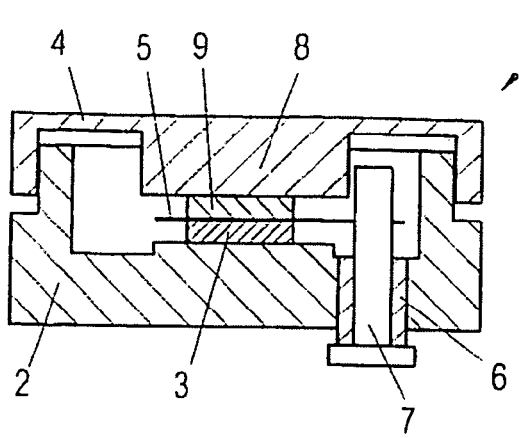
FIGS. 1, 3, 5, 7, 9, 11 and 12 show a diagrammatic section through various exemplary embodiments of piezoelectric pressure transducers according to the invention.

All of the exemplary embodiments represented show piezoelectric pressure transducers 1 with at least one piezoelectric measuring element 3 arranged on a housing base part 2, which measuring element itself can also be composed of several connected layers and on the side opposite the base part 2 is connected to a diaphragm 4 sealing the base part 2 and exposed to the pressure to be measured, and is electrically connected externally in a double-pole manner. The housing base part 2 and diaphragm 4 define a sealed chamber 3 therebetween and in which each piezoelectric measuring element is positioned. The pressure acting on the diaphragm 4 from outside is transmitted as a force to the measuring element 3, which according to the known piezoelectric principle, provides a charge to both poles on opposite sides thereof, which charge is proportional to the pressure and capable of being tapped and further used.

According to FIGS. 1 through 13, the measuring element 3 is fixed to an electrode sheet 5, for example, through bonding soldering or thermocompression, with contact of one of its poles, which electrode sheet wraps around a contact pin 7 conductively and positively and thus fixing the electrode sheet in the chamber C. The contact pin extends from chamber C to the outside through an opening in the base part 2, and is insulated against the base part 2 by means of a sleeve 6. The layer fixing of the measuring element 3, which is essential in particular in the assembly and structure of the pressure transducer 1, is thus simultaneously simply and exactly resolved with the contact of the one pole of the measuring element 3, which permits a cost-effective structure of the pressure transducer 1 as well as a design thereof suitable for mass production.

Figure 2:
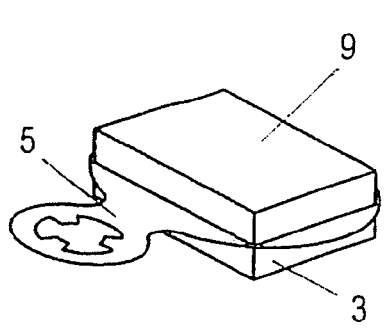
FIGS. 2, 4, 6, 8, 10 and 13 show perspective views (on an enlarged scale) of the measuring elements together with electrode sheets for the contact thereof used in the pressure transducers respectively shown alongside them—in all of these examples a mechanical unit composed of measuring elements, electrode sheets and in part also electrically insulating pressure transmission elements is prefabricated and is inserted during the assembly between the housing base part and the diaphragm.

According to FIGS. 1 and 2, only one measuring element 3 is provided with an electrode sheet 5—on the side of the electrode sheet 5 facing towards the diaphragm 4 or the central thickening 8 thereof, an electrically insulating pressure transmission element 9 is provided for insulation and force transmission, which makes it possible for the second pole of the measuring element 3 to be contacted externally via the housing base part 2.

Figure 3:
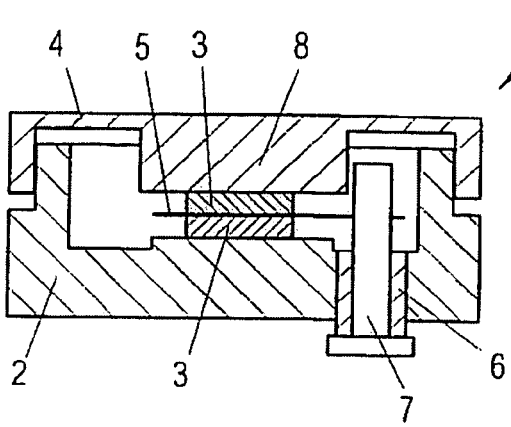
Figure 4:
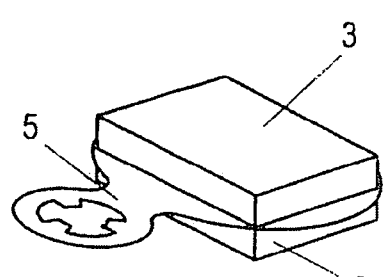
Figure 5:
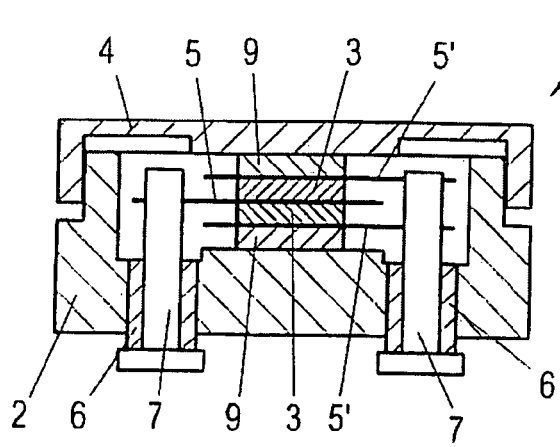
Figure 6:
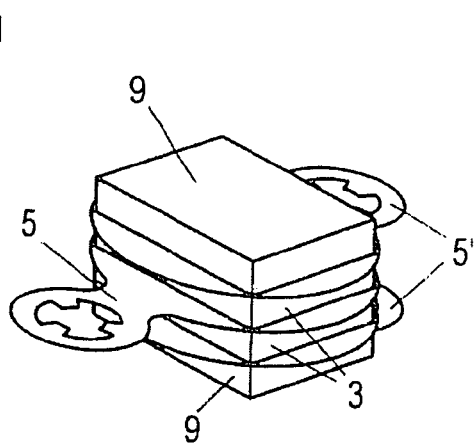

In the embodiment according to FIGS. 3 and 4, the electrode sheet 5 bears two measuring elements 3 electrically contacted thereby in a mirror-image manner, the other poles of which lying opposite the electrode sheet 5 on the one hand are contacted via the base part 2 and on the other hand via the diaphragm 4 or the thickening 8 thereof connected thereto in a conductive manner.

In the embodiment according to FIGS. 5 and 6, again two central measuring elements 3 contacted in a mirror image manner by the central electrode sheet 5 are provided, wherein the respectively second pole is connected conductively as well as positively and thus in a manner fixing the layers via two further electrode sheets 5' to a further contact pin 7 again insulated against the base part 2 by a sleeve 6 and projecting outwards. Electrically insulating pressure transmission elements 9 are here respectively again arranged between the outer electrode sheets 5' on the one hand and the base part 2 or the diaphragm 4. Thus a double-pole contacting of the measuring elements 3 insulated against the housing base part 2 and the installation environment is rendered possible, which is advantageous in many applications.

Figures 7, 8:
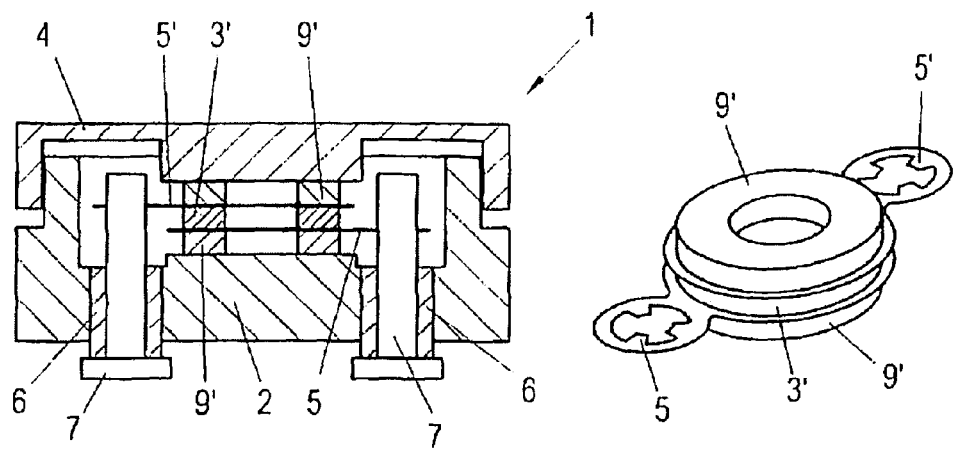

In the embodiment according to FIGS. 7 and 8 a single measuring element 3' embodied in an annular manner (similar to the embodiment according to FIG. 5) is arranged between two separate electrode sheets 5, 5' for the two poles to be lead through. As in FIG. 5, the electrode sheets 5, 5' are connected to separate contact pins 7 conductively and positively as well as in a layer fixing manner. The insulation of the electrode sheets 5, 5' to the base part 2 on the one hand and to the diaphragm 4 on the other hand again takes place via interpolated electrically insulating pressure transmission elements 9'.

Figures 9, 10:
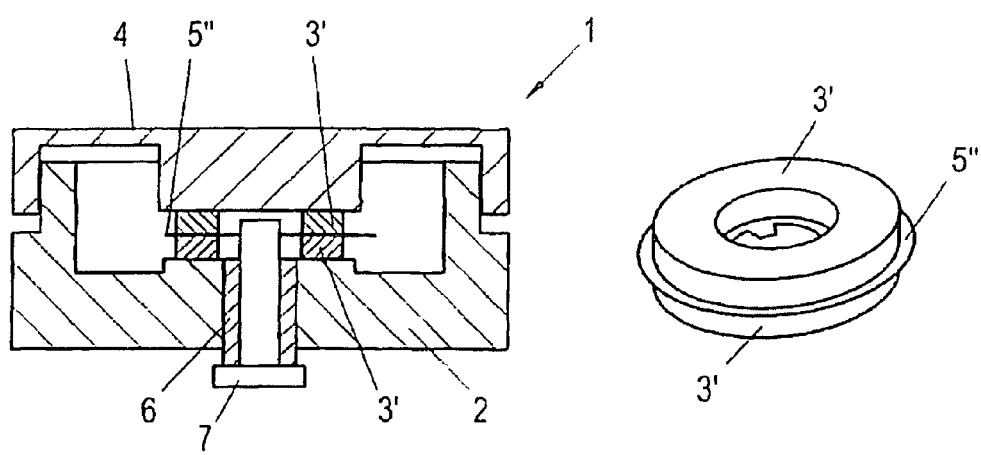

In the embodiment according to FIGS. 9 and 10, two annular measuring elements 3' are arranged concentrically around a central contact pin 7 in a mirror image manner on an electrode sheet 5" also embodied essentially in an annular manner, wherein the other two poles of the measuring elements 3' again (as in FIG. 3) are contacted or lead through via the base part 2 and the diaphragm 4. A symmetrical structure of the pressure transducer 1, such as is advantageous for various applications, thus results.

Figure 11:
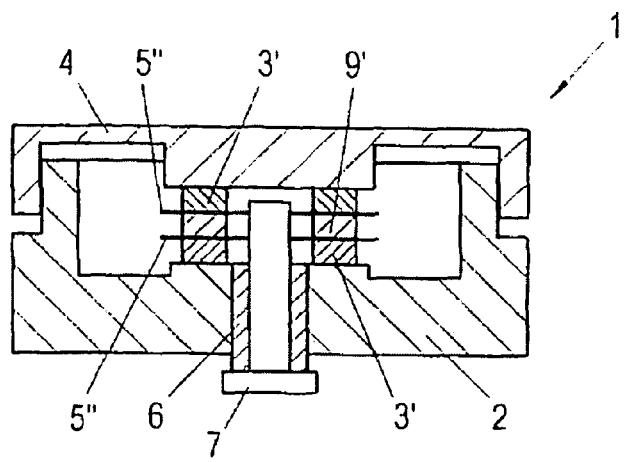

The embodiment according to FIG. 11 differs from that according to FIG. 9 essentially only in that here two annular measuring elements 3' connected in a mirror image manner are now arranged on two electrode sheets 5" in contact with the central contact pin 7 outside and bearing against the base part 2 on the one hand and the thickening 8 of the diaphragm 4 on the other hand. An electrically insulating pressure transmission element 9' is again arranged between the two electrode sheets 5".

Figures 12, 13:
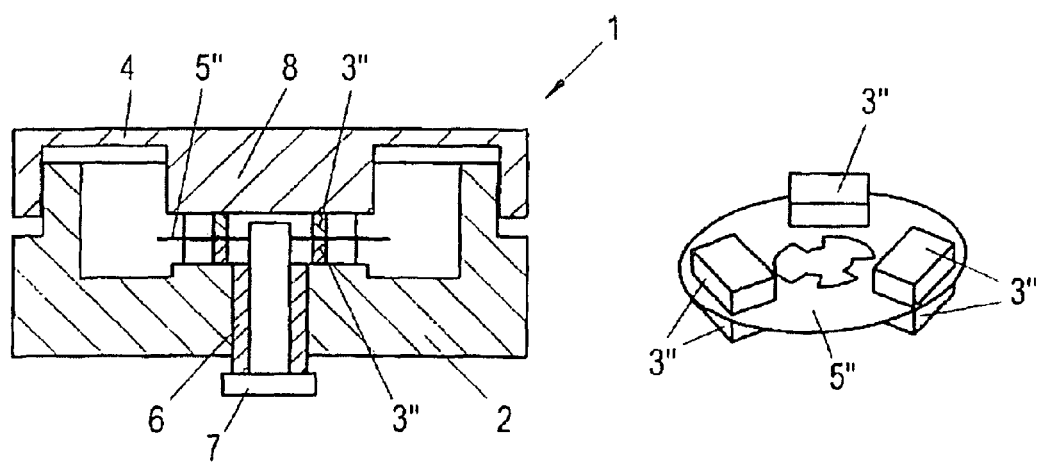

In the embodiment according to FIGS. 12 and 13, three separate measuring elements 3" are arranged in one plane in a star-shaped manner around the centrally arranged contact pin on an electrode sheet 5", wherein three further measuring elements 3" contacted in a mirror image manner are attached on the opposite side of this electrode sheet 5", which measuring elements are directly contacted externally, similar to the embodiments according to FIG. 3 and FIG. 9, on their side lying opposite the electrode sheet 5" via the base part 2 or the thickening 8 of the diaphragm 4.

In the embodiments according to FIGS. 14 through 20, either respectively one measuring element 3, 3' (FIGS. 14 through 16 and 20) or respectively one electrically insulating pressure transmission element 9, 9' (FIGS. 17 through 19) is fixed directly on the base part 2 or the thickening 8 of the diaphragm 4, which can be carried out advantageously before the final assembly, for example, by means of bonding, soldering or thermocompression.

In the embodiment according to FIG. 14, only one electrode sheet 5 is inserted between the measuring elements 3 fixed on the base part 2 and on the diaphragm 4 and there contacted in a single-sided manner during the final assembly, which electrode sheet wraps around a contact pin 7, projecting outwards and insulated with respect to the base part 2 by means of a sleeve 6, conductively as well as positively and therefore in a manner fixing the layers—the same also applies to the embodiment according to FIG. 15, which differs from FIG. 14 only through the rectangular or square embodiment of the measuring elements 3 here.

According to FIG. 16 (similar to the embodiments according to FIGS. 9 through 12), a centrally arranged contact pin 7 is provided, on which a round electrode sheet 5" with a central recess acts in a positive and layer fixing manner. The measuring elements 3' are in turn embodied as two annular elements, which are in contact on the one hand via the electrode sheet 5" and on the other hand via the basis part 2 and the diaphragm 4.

Figure 17:
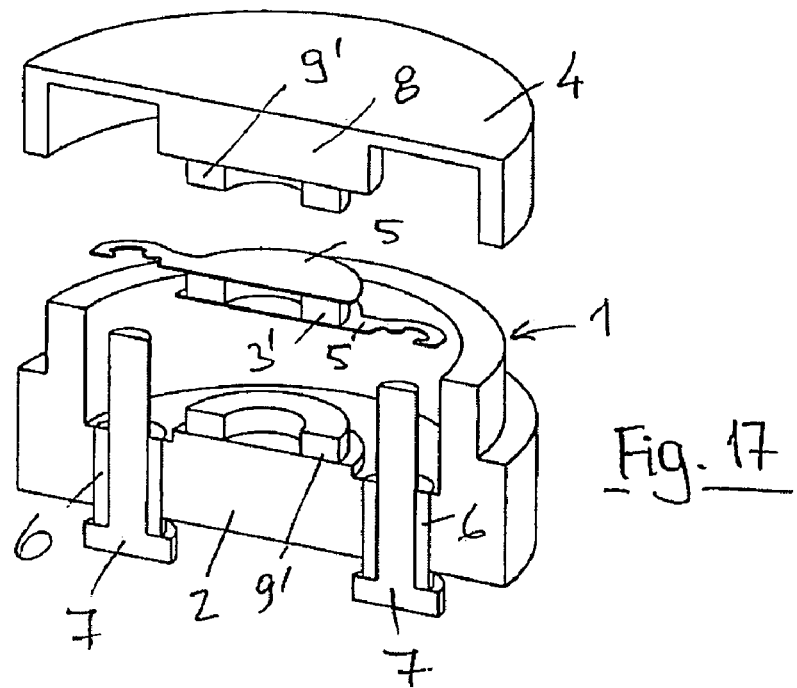
Figure 18:
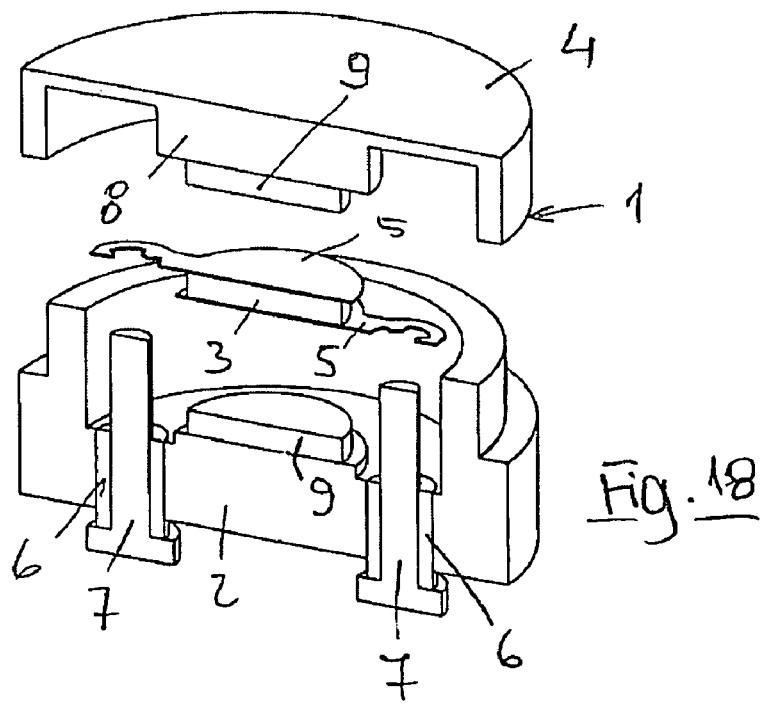
Figure 19:
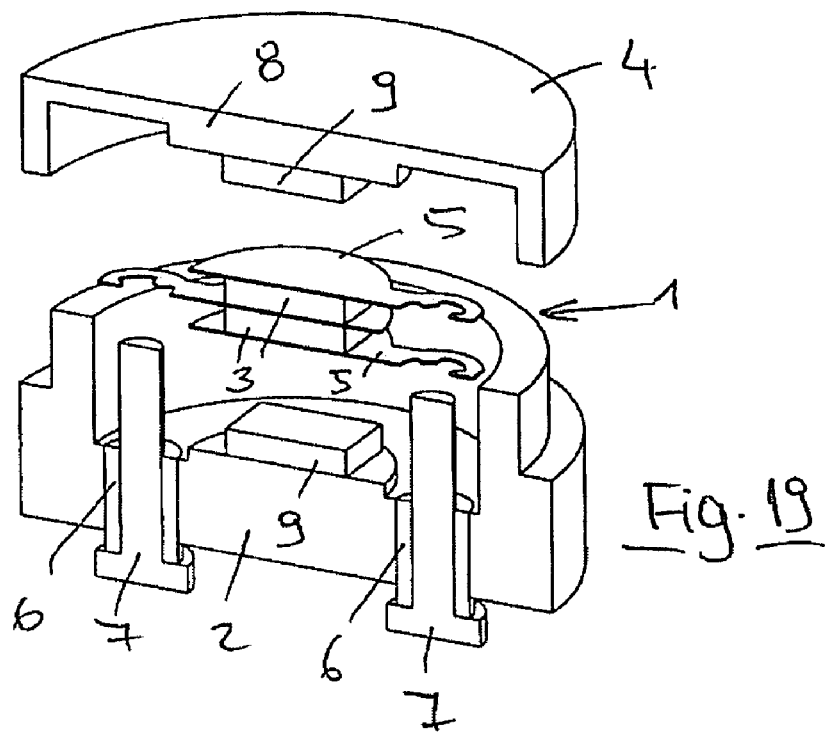

In the embodiments according to FIGS. 17 through 19, mechanical units connected by means of bonding or the like and comprising measuring elements 3, 3' and electrode sheets 5 are inserted between the electrically insulating pressure transmission elements 9 fixed on the housing base part 2 and on the diaphragm 4. In all of the cases the contacting of the two poles of the measuring elements is carried out here via two separate contact pins 7 insulated with respect to the housing base part.

According to FIGS. 17 and 18, respectively only one measuring element 3 or 3' is inserted between two electrode sheets and fixed in advance in the manner described. According to FIG. 19, two measuring elements 3 are arranged in a mirror inverted manner on a central electrode sheet 5—the contacting of the outer poles is carried out via two further electrode sheets 5 to the other of the two contact pins 7.

Figure 20:
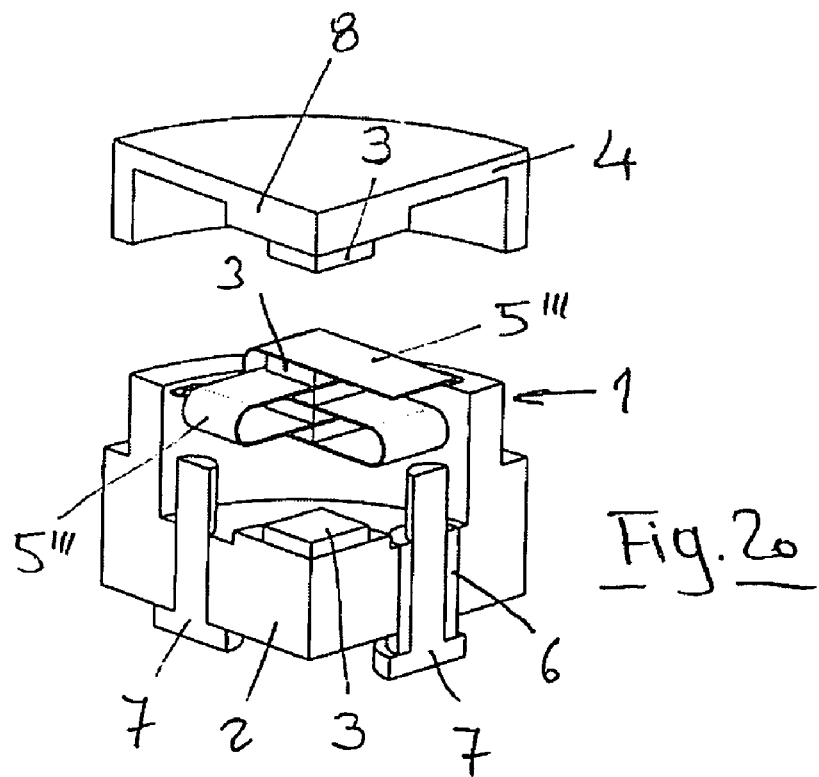

According to FIG. 20, only the right one of the contact pins 7 shown is insulated by means of a sleeve 6 with respect to the housing base part 2—the left one of the two contact pins 7 is electrically conductively connected to the housing base part 2 and thus also to the diaphragm 4 and, in addition to contacting and position fixing of the one of the two electrode sheets 5''' looped in a strip-like manner between the central measuring elements 3, is also used for making contact to the poles on the housing side and diaphragm side of the two outer measuring elements 3. The central four measuring elements 3 are arranged respectively in a mirror inverted manner between the contact surfaces of the two electrode sheets 5''' and connected thereto to form a mechanical unit in the described manner.

The diaphragm 4 is embodied in all of the exemplary embodiments shown as an essentially cup-shaped, one-piece turned part or deep drawn part and connected directly to the housing base part 2, preferably by means of circumferential welding not shown separately here, which permits a simple production and assembly, optionally also with controlled prestressing of the measuring elements 3, 3', 3". Apart from this, the connection between the housing base part 2 and diaphragm 4 also could be carried out in another suitable manner—for example, through screwing, adhesion, pressing, butt welding or similar methods. Furthermore, in all of the cases here the housing base part is also embodied essentially in a cup-shaped manner and could also be connected directly to a diaphragm embodied essentially in a flat manner, deviating from the exemplary embodiments shown, which permits further design options.

The invention claimed is:
1. A piezoelectric pressure transducer which comprises:
a housing base part,
a diaphragm which cooperates with said housing base part to define a sealed chamber therebetween, said diaphragm being exposed to a pressure to be measured,
a first contact pin which extends from said chamber out of said transducer,
a first piezoelectric measuring element positioned in the chamber between the housing base part and the diaphragm, said first piezoelectric measuring element providing first and second poles on opposite first and second sides thereof, and
a first electrode sheet located in said chamber and in contact with said first pole of said first piezoelectric measuring element, said first electrode sheet including a portion which encloses and grips said first contact pin to maintain positioning of said first electrode sheet in said chamber.

2. The piezoelectric pressure transducer according to claim 1, wherein said first electrode sheet is fixedly attached to said first piezoelectric measuring element.

3. The piezoelectric pressure transducer according to claim 1, wherein said first contact pin extends externally of the transducer through an opening in said housing base part, and including an insulation sleeve around said first contract pin to fill said opening.

4. The piezoelectric pressure transducer according to claim 3, wherein said second pole of said first piezoelectric measuring element contacts said housing base part.

5. The piezoelectric pressure transducer according to claim 4, wherein a first pressure transmission element is positioned between said first electrode sheet and said diaphragm.

6. The piezoelectric pressure transducer according to claim 5, wherein said first piezoelectric measuring element and said first pressure transmission element are annular in shape and are concentrically positioned around said first contact pin, and wherein a center portion of said first electrode sheet encloses and grips said first contact pin.

7. The piezoelectric pressure transducer according to claim 6, including a second annular piezoelectric measuring element positioned between said first annular pressure transmission element and said diaphragm, and a second electrode sheet positioned between said first annular pressure transmission element and said second annular piezoelectric measuring element, said second electrode sheet having a center portion which encloses and grips said first contact pin.

8. The piezoelectric pressure transducer according to claim 3, wherein said second pole of said first piezoelectric measuring element contacts said housing base part, and including a second piezoelectric measuring element positioned between said first electrode sheet and said diaphragm, said second piezoelectric measuring element having first and second poles on opposite first and second sides thereof, a first pole surface of said second piezoelectric measuring element facing said first pole surface of said first piezoelectric measuring surface and in contact with said first electrode sheet.

9. The piezoelectric pressure transducer according to claim 8, wherein said first and second piezoelectric measuring elements are annular in shape and are concentrically positioned around said first contact pin, and wherein a center portion of said first electrode sheet encloses and grips said first contact pin.

10. The piezoelectric pressure transducer according to claim 8, wherein a plurality of spaced first and second piezoelectric measuring elements are annularly positioned in respective planes around said first contact pin, and wherein a center portion of said first electrode sheet encloses and grips said first contact pin.

11. The piezoelectric pressure transducer according to claim 1, including a second contact pin which extends from said chamber out of said transducer, a second piezoelectric measuring element positioned between said first electrode sheet and said diaphragm, a first pressure transmission element positioned between said second piezoelectric measuring element and said diaphragm, a second electrode sheet positioned between said second piezoelectric measuring element and said first pressure transmission element, a second pressure transmission element between the first piezoelectric measuring element and said housing base part, and a third electrode sheet positioned between the first piezoelectric measuring element and said second pressure transmission element, said second and third electrode sheets including portions which enclose and grip said second contact pin.

12. The piezoelectric pressure transducer according to claim 1, including a second contact pin which extends from said chamber out of said transducer, a first pressure transmission element positioned between said first electrode sheet and said diaphragm, a second pressure transmission element positioned between said first piezoelectric measuring element and said housing base part, and a second electrode sheet positioned between said first piezoelectric measuring element and said second pressure transmission element, said second electrode sheet including a portion which encloses and grips said second contact pin.

13. The piezoelectric pressure transducer according to claim 12, wherein said first piezoelectric measuring element and said first and second pressure transmission elements are annular in shape.

14. The piezoelectric pressure transducer according to claim 1, wherein said diaphragm is cup-shaped and is circumferentially welded to said housing base part.

* * * * *